US009512346B2

(12) United States Patent
Roddy

(10) Patent No.: US 9,512,346 B2
(45) Date of Patent: *Dec. 6, 2016

(54) CEMENT COMPOSITIONS AND METHODS UTILIZING NANO-HYDRAULIC CEMENT

(75) Inventor: Craig W. Roddy, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 110 days.

This patent is subject to a terminal disclaimer.

(21) Appl. No.: 12/263,954

(22) Filed: Nov. 3, 2008

(65) Prior Publication Data

US 2009/0124522 A1 May 14, 2009

Related U.S. Application Data

(63) Continuation-in-part of application No. 11/388,645, filed on Mar. 24, 2006, now abandoned, which is a continuation-in-part of application No. 10/775,348, filed on Feb. 10, 2004, now Pat. No. 7,086,466, application No. 12/263,954, which is a continuation-in-part of application No. 12/283,398, filed on Sep. 11, 2008, now Pat. No. 7,607,482, which is a continuation-in-part of application No. 11/223,669, filed on Sep. 9, 2005, now Pat. No. 7,445,669, application No. 12/263,954, which is a continuation-in-part of application No. 11/747,002, filed on May 10, 2007, now Pat. No. 7,559,369.

(51) Int. Cl.
C09K 8/74 (2006.01)
C09K 8/46 (2006.01)
C04B 7/52 (2006.01)
C04B 20/10 (2006.01)
C04B 28/02 (2006.01)
C04B 28/08 (2006.01)
C09K 8/473 (2006.01)
C09K 8/70 (2006.01)
C09K 8/80 (2006.01)
C04B 111/00 (2006.01)

(52) U.S. Cl.
CPC .............. C09K 8/46 (2013.01); C04B 7/527 (2013.01); C04B 20/10 (2013.01); C04B 20/1011 (2013.01); C04B 28/02 (2013.01); C04B 28/08 (2013.01); C09K 8/473 (2013.01); C09K 8/70 (2013.01); C09K 8/80 (2013.01); C04B 2111/00146 (2013.01); C09K 2208/10 (2013.01); Y02W 30/92 (2015.05); Y02W 30/94 (2015.05); Y02W 30/95 (2015.05)

(58) Field of Classification Search
None
See application file for complete search history.

(56) References Cited

U.S. PATENT DOCUMENTS

| 2,094,316 | A | 9/1937 | Cross et al. |
|---|---|---|---|
| 2,329,940 | A | 9/1943 | Ponzer |
| 2,842,205 | A | 7/1958 | Allen et al. |
| 2,848,051 | A | 8/1958 | Willaims |
| 2,857,286 | A | 10/1958 | Striker |
| 2,871,133 | A | 1/1959 | Palonen et al. |
| 2,933,135 | A | 4/1960 | Johnson |
| 2,945,769 | A | 7/1960 | Gama et al. |
| 2,952,318 | A | 9/1960 | Ritch |
| 2,959,223 | A | 11/1960 | Harmon et al. |
| 2,978,024 | A | 4/1961 | Davis |
| 3,026,938 | A | 3/1962 | Huitt et al. |
| 3,079,268 | A | 2/1963 | Brooks |
| 3,168,139 | A | 2/1965 | Kennedy et al. |
| 3,219,112 | A | 11/1965 | Sauber et al. |
| 3,336,979 | A | 8/1967 | Ingraham et al. |
| 3,353,601 | A | 11/1967 | Dollarhide et al. |
| 3,366,177 | A | 1/1968 | Powers et al. |
| 3,454,095 | A | 7/1969 | Messenger et al. |
| 3,499,491 | A | 3/1970 | Wyant et al. |
| 3,557,876 | A | 1/1971 | Tragesser |
| 3,607,326 | A | 9/1971 | Serafin |
| RE27,271 | E | 1/1972 | Harnsberger et al. |
| 3,748,159 | A | 7/1973 | George |
| 3,854,985 | A | 12/1974 | Suzuki et al. |

(Continued)

FOREIGN PATENT DOCUMENTS

| CA | 2514492 | 9/2004 |
|---|---|---|
| CA | 2153372 | 1/2006 |

(Continued)

OTHER PUBLICATIONS

"Effect of the particle size on the micro and nanostructural features of calcium phosphate cement: a kinetic analysis", Biomaterials 25 (2004) 3453-3462.*

(Continued)

Primary Examiner — John J Figueroa
(74) Attorney, Agent, or Firm — Craig W. Roddy; Tumey L.L.P.

(57) ABSTRACT

An exemplary method includes introducing a treatment fluid comprising nano-hydraulic cement into a subterranean formation. The treatment fluid may include a drilling fluid, a completion fluid, a stimulation fluid, a well clean-up fluid or a cement composition. Another example method comprises introducing a cement composition comprising nano-hydraulic cement, hydraulic cement, and water into a subterranean formation; and allowing the cementing composition to set in the subterranean formation. An example well treatment fluid comprises nano-hydraulic cement.

23 Claims, No Drawings

(56) References Cited

U.S. PATENT DOCUMENTS

| | | |
|---|---|---|
| 3,876,005 A | 4/1975 | Fincher et al. |
| 3,877,522 A | 4/1975 | Knight et al. |
| 3,887,009 A | 6/1975 | Miller et al. |
| 3,887,385 A | 6/1975 | Quist et al. |
| 3,888,311 A | 6/1975 | Cooke, Jr. |
| 3,958,638 A | 5/1976 | Johnston |
| 4,018,617 A | 4/1977 | Nicholson |
| 4,031,184 A | 6/1977 | McCord |
| 4,101,332 A | 7/1978 | Nicholson |
| 4,142,910 A | 3/1979 | Kraemer et al. |
| 4,176,720 A | 12/1979 | Wilson |
| 4,202,413 A | 5/1980 | Messenger |
| 4,202,795 A | 5/1980 | Burnham et al. |
| 4,235,291 A | 11/1980 | Messenger |
| 4,268,316 A | 5/1981 | Wills et al. |
| 4,284,433 A | 8/1981 | Aignesberger et al. |
| 4,341,562 A | 7/1982 | Ahlbeck |
| 4,353,746 A * | 10/1982 | Birchall et al. ............ 106/713 |
| RE31,190 E | 3/1983 | Detroit et al. |
| 4,400,474 A | 8/1983 | Copperthwaite et al. |
| 4,407,677 A | 10/1983 | Wills et al. |
| 4,432,800 A | 2/1984 | Kneller et al. |
| 4,435,216 A | 3/1984 | Diehl et al. |
| 4,460,292 A | 7/1984 | Durham et al. |
| 4,494,990 A | 1/1985 | Harris |
| 4,506,734 A | 3/1985 | Nolte |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,643,362 A | 2/1987 | Serafin |
| 4,650,520 A * | 3/1987 | Johnsen et al. ............ 106/639 |
| 4,660,642 A | 4/1987 | Young |
| 4,676,317 A | 6/1987 | Fry et al. |
| 4,711,401 A | 12/1987 | Serafin |
| 4,721,160 A | 1/1988 | Parcevaux et al. |
| 4,741,401 A | 5/1988 | Walles et al. |
| 4,741,782 A | 5/1988 | Styron |
| 4,761,183 A | 8/1988 | Clarke |
| 4,770,796 A | 9/1988 | Jacobs |
| 4,784,223 A | 11/1988 | Worrall et al. |
| 4,822,421 A | 4/1989 | Crabb |
| 4,848,973 A | 7/1989 | Yokota et al. |
| 4,883,125 A | 11/1989 | Wilson et al. |
| 4,941,536 A | 7/1990 | Brothers et al. |
| 4,961,790 A | 10/1990 | Smith et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,102,558 A * | 4/1992 | McDougall et al. ......... 507/260 |
| 5,121,795 A * | 6/1992 | Ewert et al. ............... 166/292 |
| 5,123,487 A * | 6/1992 | Harris et al. .............. 166/277 |
| 5,125,455 A | 6/1992 | Harris et al. |
| 5,127,473 A * | 7/1992 | Harris et al. .............. 166/277 |
| 5,149,370 A * | 9/1992 | Olaussen et al. ........... 166/292 |
| 5,151,203 A | 9/1992 | Riley et al. |
| 5,183,505 A | 2/1993 | Spinney |
| 5,203,629 A | 4/1993 | Valle et al. |
| 5,207,832 A | 5/1993 | Baffreau et al. |
| 5,213,160 A | 5/1993 | Nahm et al. |
| 5,236,501 A | 8/1993 | Nomachi et al. |
| 5,238,064 A | 8/1993 | Dahl et al. |
| 5,253,991 A | 10/1993 | Yokota et al. |
| 5,263,542 A * | 11/1993 | Brothers ..................... 166/293 |
| 5,266,111 A | 11/1993 | Barbour |
| 5,292,512 A | 3/1994 | Schaefer et al. |
| 5,295,543 A | 3/1994 | Terry et al. |
| 5,305,831 A | 4/1994 | Nahm |
| 5,314,022 A | 5/1994 | Cowan et al. |
| 5,320,851 A | 6/1994 | Mars et al. |
| 5,327,968 A | 7/1994 | Onan et al. |
| 5,337,824 A | 8/1994 | Cowan |
| 5,339,903 A | 8/1994 | Eoff et al. |
| 5,340,397 A | 8/1994 | Brothers |
| 5,346,012 A * | 9/1994 | Heathman et al. .......... 166/293 |
| 5,352,288 A | 10/1994 | Mallow |
| 5,358,044 A | 10/1994 | Hale et al. |
| 5,358,047 A | 10/1994 | Himes et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,375,661 A * | 12/1994 | Daneshy et al. ............. 166/278 |
| 5,382,290 A | 1/1995 | Nahm et al. |
| 5,383,521 A | 1/1995 | Onan et al. |
| 5,383,967 A | 1/1995 | Chase |
| 5,389,706 A * | 2/1995 | Heathman et al. .......... 166/293 |
| 5,398,758 A | 3/1995 | Onan et al. |
| 5,398,759 A * | 3/1995 | Rodrigues et al. .......... 166/293 |
| 5,423,379 A | 6/1995 | Hale et al. |
| 5,439,056 A | 8/1995 | Cowan |
| 5,458,195 A | 10/1995 | Totten et al. |
| 5,464,060 A | 11/1995 | Hale et al. |
| 5,472,051 A | 12/1995 | Brothers |
| 5,476,142 A | 12/1995 | Kajita |
| 5,476,144 A | 12/1995 | Nahm et al. |
| 5,484,019 A | 1/1996 | Griffith |
| 5,484,480 A | 1/1996 | Styron |
| 5,494,513 A | 2/1996 | Fu et al. |
| 5,499,677 A | 3/1996 | Cowan |
| 5,509,962 A | 4/1996 | Tang |
| 5,515,921 A | 5/1996 | Cowan et al. |
| 5,518,996 A | 5/1996 | Maroy et al. |
| 5,520,730 A | 5/1996 | Barbour |
| 5,529,624 A | 6/1996 | Riegler |
| 5,536,311 A | 7/1996 | Rodrigues |
| 5,542,782 A | 8/1996 | Carter et al. |
| 5,551,976 A | 9/1996 | Allen |
| 5,569,324 A | 10/1996 | Totten et al. |
| 5,571,318 A | 11/1996 | Griffith et al. |
| 5,580,379 A | 12/1996 | Cowan |
| 5,585,333 A | 12/1996 | Dahl et al. |
| 5,588,488 A | 12/1996 | Vijn et al. |
| 5,588,489 A | 12/1996 | Chatterji et al. |
| 5,603,961 A | 2/1997 | Suzuki et al. |
| 5,673,753 A | 10/1997 | Hale et al. |
| 5,693,137 A | 12/1997 | Styron |
| 5,711,383 A | 1/1998 | Terry et al. |
| 5,716,910 A | 2/1998 | Totten et al. |
| 5,728,209 A | 3/1998 | Bury et al. |
| 5,728,654 A | 3/1998 | Dobson et al. |
| 5,741,357 A | 4/1998 | Sheikh |
| 5,766,323 A | 6/1998 | Butler et al. |
| 5,795,060 A | 8/1998 | Stephens |
| 5,820,670 A | 10/1998 | Chatterji et al. |
| 5,851,960 A | 12/1998 | Totten et al. |
| 5,866,516 A | 2/1999 | Costin |
| 5,874,387 A | 2/1999 | Carpenter et al. |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 6,022,408 A | 2/2000 | Stokes et al. |
| 6,027,561 A | 2/2000 | Gruber et al. |
| 6,060,434 A | 5/2000 | Sweatman et al. |
| 6,060,535 A | 5/2000 | Villar et al. |
| 6,063,738 A | 5/2000 | Chatterji et al. |
| 6,138,759 A | 10/2000 | Chatterji et al. |
| 6,143,069 A | 11/2000 | Brothers et al. |
| 6,145,591 A | 11/2000 | Boncan et al. |
| 6,153,562 A | 11/2000 | Villar et al. |
| 6,167,967 B1 | 1/2001 | Sweatman |
| 6,170,575 B1 | 1/2001 | Reddy et al. |
| 6,230,804 B1 | 5/2001 | Mueller et al. |
| 6,244,343 B1 | 6/2001 | Brothers et al. |
| 6,245,142 B1 | 6/2001 | Reddy et al. |
| 6,258,757 B1 | 7/2001 | Sweatman et al. |
| 6,277,189 B1 | 8/2001 | Chugh |

(56) References Cited

U.S. PATENT DOCUMENTS

| | | |
|---|---|---|
| 6,279,655 B1 | 8/2001 | Pafitis et al. |
| 6,312,515 B1 | 11/2001 | Barlet-Gouedard et al. |
| 6,315,042 B1 | 11/2001 | Griffith et al. |
| 6,332,921 B1 | 12/2001 | Brothers et al. |
| 6,367,550 B1 | 4/2002 | Chatterji et al. |
| 6,379,456 B1 | 4/2002 | Heathman et al. |
| 6,390,197 B1 | 5/2002 | Marcoy |
| 6,402,833 B1 | 6/2002 | O'Hearn et al. |
| 6,409,819 B1 | 6/2002 | Ko |
| 6,457,524 B1 | 10/2002 | Roddy |
| 6,471,975 B1 | 10/2002 | Banovetz et al. |
| 6,478,869 B2 | 11/2002 | Reddy et al. |
| 6,488,763 B2 | 12/2002 | Brothers et al. |
| 6,488,764 B2 | 12/2002 | Westerman |
| 6,494,951 B1 | 12/2002 | Reddy et al. |
| 6,500,252 B1 | 12/2002 | Chatterji et al. |
| 6,508,305 B1 | 1/2003 | Brannon et al. |
| 6,524,384 B2 | 2/2003 | Griffith et al. |
| 6,547,871 B2 | 4/2003 | Chatterji et al. |
| 6,547,891 B2 | 4/2003 | Linden et al. |
| 6,554,067 B1 | 4/2003 | Davies et al. |
| 6,561,273 B2 | 5/2003 | Brothers et al. |
| 6,562,122 B2 | 5/2003 | Dao et al. |
| 6,565,644 B2 | 5/2003 | Kepler et al. |
| 6,565,647 B1 | 5/2003 | Day et al. |
| 6,572,697 B2 | 6/2003 | Gleeson et al. |
| 6,599,863 B1 | 7/2003 | Palmer et al. |
| 6,610,139 B2 | 8/2003 | Reddy et al. |
| 6,626,243 B1 | 9/2003 | Go Boncan |
| 6,632,527 B1 | 10/2003 | McDaniel et al. |
| 6,645,288 B1 | 11/2003 | Dargaud et al. |
| 6,645,290 B1 | 11/2003 | Barbour |
| 6,648,962 B2 | 11/2003 | Berke et al. |
| 6,656,265 B1 | 12/2003 | Garnier et al. |
| 6,660,080 B2 | 12/2003 | Reddy et al. |
| 6,666,268 B2 | 12/2003 | Griffith et al. |
| 6,668,929 B2 | 12/2003 | Griffith et al. |
| 6,689,208 B1 | 2/2004 | Brothers |
| 6,702,044 B2 | 3/2004 | Reddy et al. |
| 6,706,108 B2 | 3/2004 | Polston |
| 6,716,282 B2 | 4/2004 | Griffith et al. |
| 6,729,405 B2 | 5/2004 | DiLullo et al. |
| 6,767,398 B2 | 7/2004 | Trato |
| 6,776,237 B2 | 8/2004 | Dao et al. |
| 6,796,378 B2 | 9/2004 | Reddy et al. |
| 6,797,054 B2 | 9/2004 | Chatterji et al. |
| 6,808,561 B2 | 10/2004 | Genge |
| 6,823,940 B2 | 11/2004 | Reddy et al. |
| 6,835,243 B2 | 12/2004 | Brothers et al. |
| 6,837,316 B2 | 1/2005 | Reddy et al. |
| 6,846,357 B2 | 1/2005 | Reddy et al. |
| 6,848,519 B2 | 2/2005 | Reddy et al. |
| 6,874,578 B1 * | 4/2005 | Garnier et al. ............... 166/293 |
| 6,883,609 B2 * | 4/2005 | Drochon et al. ............. 166/292 |
| 6,887,833 B2 | 5/2005 | Brothers et al. |
| 6,889,767 B2 | 5/2005 | Reddy et al. |
| 6,904,971 B2 | 6/2005 | Brothers et al. |
| 6,908,508 B2 | 6/2005 | Brothers |
| 6,911,078 B2 | 6/2005 | Barlet-Gouedard et al. |
| 7,048,053 B2 | 5/2006 | Santra et al. |
| 7,077,203 B1 | 7/2006 | Roddy et al. |
| 7,084,092 B2 | 8/2006 | Patel et al. |
| 7,086,466 B2 | 8/2006 | Roddy |
| 7,156,174 B2 | 1/2007 | Roddy et al. |
| 7,174,962 B1 | 2/2007 | Roddy et al. |
| 7,199,086 B1 | 4/2007 | Roddy et al. |
| 7,204,307 B2 | 4/2007 | Roddy et al. |
| 7,204,310 B1 | 4/2007 | Roddy et al. |
| 7,213,646 B2 * | 5/2007 | Roddy et al. ............... 166/285 |
| 7,279,447 B2 | 10/2007 | Lal et al. |
| 7,284,609 B2 | 10/2007 | Roddy et al. |
| 7,335,252 B2 | 2/2008 | Roddy et al. |
| 7,337,842 B2 | 3/2008 | Roddy et al. |
| 7,338,923 B2 | 3/2008 | Roddy et al. |
| 7,341,104 B2 | 3/2008 | Roddy |
| 7,353,870 B2 | 4/2008 | Roddy et al. |
| 7,381,263 B2 | 6/2008 | Roddy et al. |
| 7,387,675 B2 | 6/2008 | Roddy et al. |
| 7,424,913 B2 | 9/2008 | Roddy |
| 7,445,669 B2 | 11/2008 | Roddy et al. |
| 7,478,675 B2 | 1/2009 | Roddy et al. |
| 7,559,369 B2 * | 7/2009 | Roddy et al. ............... 166/292 |
| 7,784,542 B2 | 8/2010 | Roddy et al. |
| 7,806,183 B2 | 10/2010 | Roddy et al. |
| 7,846,876 B2 | 12/2010 | Koyanagi |
| 7,892,352 B2 | 2/2011 | Roddy et al. |
| 8,114,820 B2 | 2/2012 | Crews |
| 8,202,824 B2 | 6/2012 | Reddy et al. |
| 8,226,879 B2 | 7/2012 | Genolet et al. |
| 8,394,744 B2 | 3/2013 | Woytowich et al. |
| 8,476,203 B2 | 7/2013 | Patil et al. |
| 8,499,837 B2 | 8/2013 | Koons |
| 8,586,512 B2 | 11/2013 | Roddy et al. |
| 8,598,093 B2 | 12/2013 | Roddy et al. |
| 8,603,952 B2 | 12/2013 | Roddy et al. |
| 8,609,595 B2 | 12/2013 | Morgan et al. |
| 8,685,903 B2 | 4/2014 | Ravi et al. |
| 8,822,386 B2 | 9/2014 | Quintero et al. |
| 2002/0004464 A1 | 1/2002 | Nelson et al. |
| 2002/0033121 A1 | 3/2002 | Marko |
| 2002/0073894 A1 | 6/2002 | Genge et al. |
| 2002/0073897 A1 | 6/2002 | Trato |
| 2002/0117090 A1 | 8/2002 | Ku |
| 2002/0193257 A1 | 12/2002 | Lee et al. |
| 2003/0089281 A1 | 5/2003 | Berke et al. |
| 2003/0116065 A1 | 6/2003 | Griffith et al. |
| 2003/0116887 A1 | 6/2003 | Scott |
| 2003/0121456 A1 * | 7/2003 | Griffith et al. ............... 106/724 |
| 2003/0121660 A1 * | 7/2003 | Griffith et al. ............... 166/292 |
| 2003/0134751 A1 | 7/2003 | Lee et al. |
| 2003/0167970 A1 | 9/2003 | Polston |
| 2003/0168215 A1 * | 9/2003 | Drochon et al. ............. 166/276 |
| 2003/0234103 A1 * | 12/2003 | Lee et al. ............... 166/293 |
| 2004/0007162 A1 | 1/2004 | Morioka et al. |
| 2004/0040475 A1 | 3/2004 | De La Roij et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0121916 A1 | 6/2004 | Kono et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0261999 A1 | 12/2004 | Nguyen |
| 2005/0000734 A1 | 1/2005 | Getzlaf et al. |
| 2005/0022991 A1 | 2/2005 | Rao |
| 2005/0034867 A1 | 2/2005 | Griffith et al. |
| 2005/0056191 A1 | 3/2005 | Brothers et al. |
| 2005/0072599 A1 | 4/2005 | Luke et al. |
| 2005/0084334 A1 | 4/2005 | Shi et al. |
| 2005/0096207 A1 | 5/2005 | Urbanek |
| 2005/0098317 A1 | 5/2005 | Reddy et al. |
| 2005/0133221 A1 | 6/2005 | Chatterji et al. |
| 2005/0172864 A1 | 8/2005 | Dingsoyr et al. |
| 2005/0173117 A1 | 8/2005 | Roddy |
| 2005/0272611 A1 | 12/2005 | Lord et al. |
| 2006/0016598 A1 | 1/2006 | Urbanek |
| 2006/0025312 A1 | 2/2006 | Santra et al. |
| 2006/0046937 A1 | 3/2006 | Fu et al. |
| 2006/0054319 A1 | 3/2006 | Fyten et al. |
| 2006/0162926 A1 | 7/2006 | Roddy |
| 2006/0166834 A1 | 7/2006 | Roddy |
| 2006/0260512 A1 | 11/2006 | Nordmeyer |
| 2007/0056475 A1 | 3/2007 | Roddy et al. |
| 2007/0056479 A1 | 3/2007 | Gray |
| 2007/0056732 A1 * | 3/2007 | Roddy et al. ............... 166/292 |
| 2007/0056733 A1 | 3/2007 | Roddy et al. |
| 2007/0125534 A1 | 6/2007 | Reddy et al. |
| 2007/0186820 A1 | 8/2007 | O'Hearn |

(56) References Cited

U.S. PATENT DOCUMENTS

| | | |
|---|---|---|
| 2007/0266903 A1 | 11/2007 | Gartner et al. |
| 2008/0153720 A1 | 6/2008 | Huang et al. |
| 2008/0156491 A1 | 7/2008 | Roddy et al. |
| 2008/0277116 A1 | 11/2008 | Roddy et al. |
| 2009/0044726 A1 | 2/2009 | Brouillette et al. |
| 2009/0114126 A1 | 5/2009 | Roddy |
| 2009/0124522 A1 | 5/2009 | Roddy et al. |
| 2009/0139719 A1 | 6/2009 | Luo |
| 2009/0200029 A1 | 8/2009 | Roddy |
| 2009/0236097 A1 | 9/2009 | Roddy et al. |
| 2009/0260544 A1 | 10/2009 | Roddy et al. |
| 2009/0312201 A1 | 12/2009 | Huang et al. |
| 2010/0016183 A1 | 1/2010 | Roddy et al. |
| 2010/0025039 A1 | 2/2010 | Roddy et al. |
| 2010/0075874 A1 | 3/2010 | Mercado et al. |
| 2010/0095871 A1 | 4/2010 | Patil et al. |
| 2010/0096135 A1 | 4/2010 | Roddy et al. |
| 2011/0162845 A1 | 7/2011 | Ravi et al. |
| 2011/0237467 A1 | 9/2011 | Cornette |
| 2011/0312857 A1 | 12/2011 | Amanullah |
| 2013/0312641 A1 | 11/2013 | Chatterji et al. |

FOREIGN PATENT DOCUMENTS

| | | | |
|---|---|---|---|
| CN | 101544488 | | 9/2009 |
| DE | 102007042078 | | 3/2009 |
| DE | 102007042078 | A1 | 3/2009 |
| EP | 0748782 | | 12/1996 |
| EP | 0814067 | | 12/1997 |
| EP | 1236701 | | 9/2002 |
| EP | 1394137 | | 7/2003 |
| EP | 1348831 | | 10/2003 |
| EP | 1686234 | A1 | 8/2006 |
| EP | 1719741 | A1 | 11/2006 |
| EP | 2465910 | A1 | 11/2009 |
| FR | 2787105 | | 6/2000 |
| GB | 1469954 | | 4/1997 |
| JP | 52117316 | | 10/1977 |
| JP | 10110487 | | 4/1998 |
| SU | 1373781 | | 2/1988 |
| WO | WO 83/01443 | | 4/1983 |
| WO | 9011977 | | 10/1990 |
| WO | WO 97/05079 | | 2/1997 |
| WO | WO 98/54108 | | 12/1998 |
| WO | WO 00/63134 | | 1/2000 |
| WO | WO 00/49272 | | 8/2000 |
| WO | WO 0050357 | A1 * | 8/2000 |
| WO | 01/87796 | | 11/2001 |
| WO | WO 0187796 | A1 * | 11/2001 |
| WO | WO 03/031364 | | 4/2003 |
| WO | WO 2004/001188 | | 12/2003 |
| WO | WO 2005/047212 | | 5/2005 |
| WO | WO 2005/061846 | | 7/2005 |
| WO | WO 2005/080287 | | 8/2005 |
| WO | WO 2005/087660 | | 9/2005 |
| WO | 2006072069 | | 7/2006 |
| WO | 2008034461 | | 3/2008 |
| WO | 2009030758 | A1 | 3/2009 |
| WO | WO 2009030758 | | 3/2009 |

OTHER PUBLICATIONS

USPTO Notice of Allowability from U.S. Appl. No. 12/426,393, dated Dec. 16, 2010.
PCT International Search Report for International Application No. PCT/GB2010/001806, dated Jan. 20, 2011.
PCT Written Opinion for International Application No. PCT/GB2010/001806, dated Jan. 20, 2011.
English language abstract of CN 101544488, published Sep. 30, 2009.
PCT International Searching Authority for International Application No. PCT/GB2009/002596 dated Feb. 8, 2010.
Office Action from U.S. Appl. No. 12/426,645, dated May 5, 2010.
Office Action from U.S. Appl. No. 12/472,561, dated May 5, 2010.
International Search Report for PCT/GB/2010/001045 dated Jul. 21, 2010.
Written Opinion of the International Searching Authority for PCT/GB/2010/001045 dated Jul. 21, 2010.
USPTO Office Action for U.S. Appl. No. 12/349,676 dated Nov. 4, 2009.
USPTO Office Action for U.S. Appl. No. 12/833,189 dated Nov. 10, 2010.
USPTO Office Action for U.S. Appl. No. 12/833,189 dated Oct. 1, 2010.
USPTO Office Action for U.S. Appl. No. 11/388,645 dated Aug. 17, 2010.
USPTO Office Action for U.S. Appl. No. 11/388,645 dated Jul. 30, 2009.
International Search Report and Written Opinion issued in PCT/GB2009/002596 dated Jul. 19, 2010.
"Effect of Nano-SiO2 on heat of hydration of portland cement," Xu et al., Nanjing Gongye Daxue Xuebao, Ziran Kexeuban (2007), 29(4), 45-48, abstract only.
"Application of nanometer silica in inorganic nonmetallic materials," Deng et al., Taoci (Xiangyang China) 2007, (9), 8-12, abstract only.
"Reaction mechanism analyses of cement based composite materials modified by nano-silica," Xu et al., Kuangye Gongcheng (Changsha, China), 2007, 27(3), 99-102, abstract only.
"Research on Reinforcement of cement composites and relevant mechanism," Yu et al., Qiangdoa Keji Daxue Xuebao, Ziran Kexueban (2006), 27(2), 148-151, abstract only.
"Antagonistic Effect of superplasticizer and colloidal nanosilica in the hydration of Alite and Belite pastes," Bjoernstrom et al., Journal of Materials Science, 2007, 42(11), 3901-3907, abstract only.
"Nano-concrete: possibilities and challenges," Balaguru et al., RILEM Proceedings (2005), PRO 45 (2nd Int'l Symposium on Nanotechnology in construction (NICOM2), 2005, 233-243, abstract only.
"A comparative study on the pozzolanic activity between nano-SiO2 and silica fume," Ye et al., Journal of Wuhan Univ of Technology, Mat'ls Science Edition (2006), 21(3), 153-157, abstract only.
"Optimization of silica fume, fly ash and amorphous nano-silica in superplasticized high-performance concrete," Collepardi et al., American Concrete Institute, SP 2004, SP-221 (Eight CANMET/ACI International Conference on Fly Ash, Silica Fume, Slag, and Natrural Pozzolans in Concrete, 2004), 495-505, abstract only.
"Accelerating effects of colloidal nano-silica for beneficial calcium-silicate-hydrate formation in cement," Bjornstrom et al., Chemical Physics Letters (2004), 392 (1-3), 242-248, abstract only.
"Experimental study on cement-based composites with nano-SiO2," Feng et al., Cailiao Kexue Yu Gongcheng Zuebao Bianjibu (2004), 22(2), 224-227.
"Strong and bioactive composites containing nano-silica-fused whiskers for bone repair," Xu et al., Biomaterials (2004), 25(19), 4615-4626, abstract only.
Research on properties of Portland cement added with nano-SiO2, Wang et al., RILEM Proceedings (2003), PRO 32 (International Conference on Advances in Concrete and Structures, 2003, vol. 1), 154-161, abstract only.
"Comparison on properties of high strength concrete with nano-SiO2 and silica fume added," Ye et al., Jianzhu Cailiao Xuebao (2003), 6(4), 381-385, abstract only.
"Study on compound effect of silica fume and nano-SiOx for cementing composite materials," Tang et al., Guisuanyan Xuebao (2003), 3(5), 523-527, abstract only.
"Effect of nano-SiOx and silica fume on cement paste water demand," Li et al., Shenyang Jianzhu gongcheng Xueyuan Xuebao, Ziran Kexueban (2002), 18(4), 278-281, abstract only.
"Hydration reaction between C3S and fly ash, silica fume, nano-SiO2, and microstructure of hydrated pastes," Ba et al., Guisuanyan Xuebao (2002), 30(6), 780-784, abstract only.

(56) References Cited

OTHER PUBLICATIONS

"Nano-silica—an additive for high-strength concrete," Wagner et al., Wissenschaftliche Zeitschrift—Hoschule fuer Architektur und Bauwesen Weimar—Universitaet (1994), 40 (5/6/7), 183-87, abstract only.
"Investigations on the preparation and mechanical properties of the nano-alumina reinforced cement composite," Li et al., Materials Letters (2006), 0(3), 356-359, abstract only.
"Effect of secondary interface microstructure on pore structure and performance of cement-based materials," Feng et al., Cailiao Yanjiu Xuebao (2003), 17(5), 489-494, abstract only.
"Preparation of multifunctional dry-power paints," Yanmin Gao, Faming Zhuanli Shenqing gongkai Shuomingshu, 4 pages, 2005, abstract only.
USPTO office action from U.S. Appl. No. 12/426,393, dated Jul. 2, 2010.
USPTO notice of allowance from U.S. Appl. No. 12/472,561, dated Jun. 29, 2010.
PCT International Search Report and Written Opinion for International Application No. PCT/GB2010/000485 dated May 21, 2010.
U.S. Appl. No. 12/290,986, filed Nov. 5, 2008, Roddy.
Foreign communication from a related counterpart application dated Jul. 5, 2005.
Office Action from U.S. Appl. No. 10/775,348 dated Nov. 23, 2005.
Office Action from U.S. Appl. No. 10/775,348 dated May 2, 2006.
Notice of Allowance from U.S. Appl. No. 10/775,348 dated Jun. 6, 2006.
Foreign communication from a related counterpart application dated Jun. 29, 2007.
Notice of Allowance from U.S. Appl. No. 11/388,644 dated Jan. 3, 2008.
Office Action from U.S. Appl. No. 12/008,923 dated May 20, 2008.
Notice of Allowance from U.S. Appl. No. 12/008,923 dated Jul. 22, 2008.
Office Action from U.S. Appl. No. 11/388,645 dated Apr. 3, 2009.
USPTO Office Action for U.S. Appl. No. 12/833,189 dated Feb. 17, 2011.
U.S. Appl. No. 12/263,954, filed Nov. 3, 2008, Roddy.
U.S. Appl. No. 12/264,010, filed Nov. 3, 2008, Roddy.
U.S. Appl. No. 12/283,398, filed Sep. 11, 2008, Roddy.
Bartlet-Gouedard, "A Non-Conventional Way of Developing Cement Slurry for Geothermal Wells", 2001.
Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.
Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naiqian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art", Petroleum Engineer International, Apr. 1978.
Sugama, "Carbonation of Hydrothermally Treated Phosphate-Bonded Calcium Aluminate Cements", pp. 1-9.
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al., Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder" dated 1999.
HES Brochure "HR-4 Cement Retarder", 1999.
HES Brochure HR-5 Cement Additive, 1998.
HES Brochure "HR-7 Cement Retarder", 1999.
HES Brochure "Pozmix A Cement Additive", 1999.
HES Brochure "Pozmix Cement and Pozmix 140".
HES Brochure "SCR-100 Cement Retarder a Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LAFARGE brochure "TerraCem™", Aug. 2006.
LAFARGE MSDS "Cement Kiln Dust", Mar. 3, 2005.
LAFARGE MSDS "LaFarge Blended Cement (cement)", Mar. 3, 2005.
TXI Material Safety Data Sheet for PRESSUR-SEAL, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-793, 2005.
Answer 13 of 24 Chemical Abstracts on STN "Manufacture of ceramic particles from floatstone and fly ash", CN 1182062 (abstract only).
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, filed Feb. 2, 2007.
Office Action from U.S. Appl. No. 11/223,485, filed Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.

(56) References Cited

OTHER PUBLICATIONS

Office Action from U.S. Appl. No. 11/223,669, Jun. 18, 2007.
Office Action from U.S. Appl. No. 11/416,754 (Notice of Allowance), Jul. 2, 2007.
Office Action from U.S. Appl. No. 11/223,485 (Notice of Allowance), Aug. 3, 2007.
Office Action from U.S. Appl. No. 11/257,261, Aug. 10, 2007.
Office Action from U.S. Appl. No. 11/271,690 (Notice of Allowance), Aug. 13, 2007.
Office Action from U.S. Appl. No. 11/402,741, Sep. 6, 2007.
Office Action from U.S. Appl. No. 11/223,669, filed Oct. 9, 2007.
Office Action from U.S. Appl. No. 11/223,750, Oct. 16, 2007.
Office Action from U.S. Appl. No. 11/416,754 (Notice of Allowance), Oct. 17, 2007.
Office Action from U.S. Appl. No. 11/257,261 (Notice of Allowance), Oct. 23, 2007.
Office Action from U.S. Appl. No. 11/402,741, Oct. 24, 2007.
Office Action from U.S. Appl. No. 11/223,750 (Notice of Allowance), Dec. 11, 2007.
Office Action from U.S. Appl. No. 11/402,741 (Notice of Allowance), Dec. 13, 2007.
Office Action from U.S. Appl. No. 11/223,669, Jan. 29, 2008.
Office Action from U.S. Appl. No. 11/256,824 (Notice of Allowance), Feb. 27, 2008.
Office Action from U.S. Appl. No. 11/223,703 (Notice of Allowance), Feb. 27, 2008.
Office Action from U.S. Appl. No. 11/223,669, Apr. 8, 2008.
Office Action from U.S. Appl. No. 11/223,669 (Notice of Allowance), Jun. 30, 2008.
Foreign Search Report from a Related Application, Sep. 9, 2005.
Foreign Search Report from a Related Application, Jul. 5, 2006.
Foreign Search Report from a Related Application, Oct. 27, 2006.
Foreign Search Report from a Related Application, Nov. 2, 2006.
Foreign Search Report from a Related Application, Dec. 1, 2006.
Foreign Search Report from a Related Application, Dec. 19, 2006.
Foreign Search Report from a Related Application, May 8, 2007.
Office Action from U.S. Appl. No. 12/034,886 (Notice of Allowance), Oct. 21, 2008.
Harris et al. "Successful Remedial Operations Using Ultrafine Cement" SPE 24294, 1992.
Heathman et al. "Case Histories Regarding the Application of Microfine Cements" Cementing Technical Paper SPE 23926, 1992.
Halliburton brochure entitled "Micro Matrix Cement", Nov. 2006.
Dalrymple et al. "A Selective Water Control Process" SPE 24330, 1992.
Halim et al. "Preparation of an ultra fast binding cement from calcium silicate-based mixed oxide nanoparticles" Nanotechnology 18, 2007.
Epik Energy brochure entitled "Nanocement".
Nanocor brochure entitled "Nanoclay Structure", Jun. 24, 2008.
He et al. "Chloride Permeability and Microstructure of Portland Cement Mortars Incorporating Nanomaterials" Abstract, Transportation Research Board Annual Meeting 2007 Paper #08-1041, 2008.
Chang et al. "Material properties of portland cement paste with nano-montmorillonite" J Mater Sci (2007), May 18, 2007.
USPTO Office Action for U.S. Appl. No. 11/388,645 dated Dec. 10, 2009.
USPTO Office Action for U.S. Appl. No. 12/567,782 dated Apr. 25, 2011.
USPTO Office Action for U.S. Appl. No. 12/651,662 dated Apr. 22, 2011.
USPTO Office Action for U.S. Appl. No. 12/833,189 dated May 16, 2011.
"Hydraulic Cement," Schlumberger Oilfield Glossary, availiable at http://www.glossary.oilfield.slb.com/search.cfm, dated May 16, 2011.
Campillo et al., "Improvement of initial mechanical strength by nanoalumina in belite cements", Science Direct, Materials Letters 61, pp. 1889-1892, 2007.

PCT International Search Report and Written Opinion for International Application No. PCT/GB2011/000003 dated Apr. 18, 2011.
U.S. Appl. No. 13/052,471, filed Mar. 21, 2011, Ravi et al.
USPTO Office Action for U.S. Appl. No. 12/567,782 dated Apr. 5, 2011.
USPTO Office Action for U.S. Appl. No. 12/651,662 dated Apr. 5, 2011.
USPTO Office Action for U.S. Appl. No. 12/567,783 dated Apr. 6, 2011.
USPTO Office Action for U.S. Appl. No. 12/833,189 dated Feb. 7, 2012.
HES Brochure "Latex 2000", Aug. 2006.
USPTO Office Action for U.S. Appl. No. 12/651,662 dated Nov. 28, 2011.
USPTO Office Action for U.S. Appl. No. 12/567,782 dated Mar. 2, 2012.
USPTO Office Action for U.S. Appl. No. 13/052,471 dated Mar. 6, 2012.
USPTO Office Action for U.S. Appl. No. 12/651,662 dated Mar. 14, 2012.
USPTO Office Action for U.S. Appl. No. 12/833,189 dated Jul. 18, 2011.
USPTO Office Action for U.S. Appl. No. 12/833,189 dated Oct. 11, 2011.
USPTO Office Action for U.S. Appl. No. 12/567,783 dated Aug. 23, 2011.
International Search Report for PCT/GB2010/001805 dated Mar. 31, 2011.
Written Opinion for PCT/GB2010/001805 dated Mar. 27, 2012.
USPTO Office Action for U.S. Appl. No. 13/431,701 dated Nov. 9, 2012.
USPTO Office Action for U.S. Appl. No. 12/567,782 dated Jul. 25, 2012.
USPTO Office Action for U.S. Appl. No. 12/651,662 dated Aug. 2, 2012.
USPTO Office Action for U.S. Appl. No. 13/052,471 dated Jun. 28, 2012.
Written Opinion of the International Searching Authority for PCT/GB/2010/000485 dated Oct. 25, 2011.
Written Opinion of the International Searching Authority for PCT/GB/2011/000003 dated Jul. 12, 2012.
Communication from EPO for EPO App. No. 12159772.8 dated May 3, 2012.
Li et al., "Investigations on the preparation and mechanical properties of the nano-alumina reinforced cement composite", Science Direct, Materials Letters 60, pp. 356-359, 2006.
Search Report and Written Opinion for PCT/US2013/038343 dated Jul. 31, 2013.
Andrew R. Barron, Chemical composition of Portland Cement, viewed on Aug. 26, 2013, last edited by author on Jan. 4, 2010.
International Preliminary Report and Written Opinion of PCT/GB2010/001806 dated Mar. 27, 2012.
Office Action for U.S. Appl. No. 13/458,112 dated Sep. 5, 2013.
USPTO Office Action from U.S. Appl. No. 12/567,782 dated Feb. 8, 2013.
USPTO Office Action from U.S. Appl. No. 13/435,701 dated Feb. 19, 2013.
USPTO Office Action from U.S. Appl. No. 12/651,662 dated Feb. 13, 2013.
USPTO Office Action from U.S. Appl. No. 12/833,189 dated Feb. 6, 2013.
USPTO Office Action from U.S. Appl. No. 13/443,934 dated Mar. 4, 2013.
International Search Report and Written Opinion for PCT/GB2010/001045 dated Jul. 21, 2010.
UPSTO Office Action from U.S. Appl. No. 13/052,471 dated Feb. 4, 2013.
Communication from EPO from Application No. 12159772.8 dated Feb. 14, 2013.
USPTO Office Action from U.S. Appl. No. 13/458,112 dated Mar. 15, 2013.
International Preliminary Report on Patentability from PCT/GB2009/002596, dated May 3, 2011.

(56) References Cited

OTHER PUBLICATIONS

USPTO Office Action for U.S. Appl. No. 12/833,189 dated May 28, 2013.
UPSTO Office Action for U.S. Appl. No. 13/435,701 dated Jun. 4, 2013.
UPSTO Office Action for U.S. Appl. No. 12/567,782 dated Jun. 21, 2013.
USPTO Office Action for U.S. Appl. No. 13/443,934 dated Jun. 27, 2012.
USPTO Office Action for U.S. Appl. No. 13/052,471 dated May 10, 2013.
USPTO Office Action for U.S. Appl. No. 13/431,701, dated Jul. 11, 2013.
EPO Office Action for EP Patent Application Serial No. 09751959.9 dated Sep. 27, 2013.
Office Action for U.S. Appl. No. 12/567,783 dated Oct. 3, 2013.
Office Action for U.S. Appl. No. 13/435,701 dated Oct. 4, 2013.
Office Action for U.S. Appl. No. 13/458,112 dated Dec. 26, 2013.
Notice of Allowance from USPTO for U.S. Appl. No. 13/052,471 dated Jan. 30, 2014.
HES FlexPlug Services Brochure dated Apr. 2008.
HES Thermatek Services Brochure dated May 2005.
HES Fuse-It Circulation Treatment Brochure dated May 2005.
Office Action from USPTO for U.S. Appl. No. 13/458,112 dated Apr. 29, 2014.
Final Office Action from USPTO for U.S. Appl. No. 13/435,701 dated Feb. 20, 2014.
Office Action from USPTO for U.S. Appl. No. 13/620,013 dated Jan. 30, 2014.
Final Official Action for U.S. Appl. No. 13/458,112 dated Jul. 8, 2015.
"Drilling Fluid Using PTFE Powder As a Lubricating Agent and Methods of Drilling in Subterranean Formations," published electronically on Jan. 15, 2007. Disclosed Anonymously on IP.com.
Agarwhal et al. "Using Nanoparticles and Nanofluids to Tailor Transport Properties of Drilling Fluids for HTHP Operations," American Association of Drilling Engineers, 2009 National Technical Conference and Exhibition. Published 2009.
Tran et al. "Nanofluids for Use as Ultra-Deep Drilling Fluids," Jan. 2007.
EP App 09751959.9 Official Action dated Jan. 30, 2015.
Australian Patent Examination Report No. 1 for Australian patent application No. 2015215837 dated Feb. 25, 2016.

\* cited by examiner

CEMENT COMPOSITIONS AND METHODS UTILIZING NANO-HYDRAULIC CEMENT

CROSS REFERENCE TO RELATED APPLICATION

The present application is a continuation-in-part of Ser. No. 11/388,645, filed Mar. 24, 2006 now abandoned, entitled "Subterranean Treatment Fluids Comprising Substantially Hydrated Cement Particulates," which is a continuation-in-part of Ser. No. 10/775,348, now U.S. Pat. No. 7,086,466, filed Feb. 10, 2004, entitled "Use of Substantially Hydrated Cement Particulates in Drilling and Subterranean Applications." The present application is also a continuation-in-part of U.S. patent application Ser. No. 12/283,398, now U.S. Pat. No. 7,607,482, filed on Sep. 11, 2008, entitled "Settable Compositions Comprising Cement Kiln Dust and Swellable Particles," which is a continuation-in-part of U.S. patent application Ser. No. 11/223,669, now U.S. Pat. No. 7,445,669, filed on Sep. 9, 2005, entitled "Settable Compositions Comprising Cement Kiln Dust and Additive(s)." The present application is also a continuation-in-part of U.S. patent application Ser. No. 11/747,002, now U.S. Pat. No. 7,559,369, filed on May 10, 2007, entitled "Well Treatment Compositions and Methods Utilizing Nano-Particles." The entire disclosures of these applications are incorporated herein by reference.

BACKGROUND

The present invention relates to well treatment fluids and methods utilizing nano-particles and, in certain embodiments, to well cement compositions and methods utilizing nano-hydraulic cement.

In general, well treatments include a wide variety of methods that may be performed in oil, gas, geothermal and/or water wells, such as drilling, completion and workover methods. The drilling, completion and workover methods may include, but are not limited to, drilling, fracturing, acidizing, logging, cementing, gravel packing, perforating and conformance methods. Many of these well treatments are designed to enhance and/or facilitate the recovery of desirable fluids from a subterranean well. Examples of such well treatments are discussed hereinbelow.

In cementing methods, such as well construction and remedial cementing, well cement compositions are commonly utilized. For example, in subterranean well construction, a pipe string (e.g., casing and liners) may be run into a well bore and cemented in place using a cement composition. The process of cementing the pipe string in place is commonly referred to as "primary cementing." In a typical primary cementing method, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string functions to prevent the migration of fluids in the annulus, as well as protecting the pipe string from corrosion. Cement compositions also may be used in remedial cementing methods, such as squeeze cementing, repairing casing strings and the placement of cement plugs. In some instances, cement compositions may be used to change the direction of the well bore, for example, by drilling a pilot hole in a hardened mass of cement, commonly referred to as a "kickoff plug," placed in the well bore.

Hydraulic fracturing is a process commonly used to increase the flow of desirable fluids, such as oil and gas, from a portion of a subterranean formation. Hydraulic fracturing operations generally involve introducing a fracturing fluid into a subterranean formation at or above a pressure sufficient to create or enhance one or more fractures in the formation. Enhancing a fracture includes enlarging a pre-existing fracture in the formation. The fracturing fluid may comprise particulates, often referred to as "proppant" that are deposited in the fractures. The proppant functions to prevent the fractures from fully closing upon the release of pressure, forming conductive channels through which fluids may flow to (or from) the well bore.

Another process that involves the use of particulates is gravel packing. A "gravel pack" is a term commonly used to refer to a volume of particulate materials (such as sand) placed into a well bore to at least partially reduce the migration of unconsolidated formation particulates into the well bore. Gravel packing operations commonly involve placing a gravel pack screen in the well bore neighboring a desired portion of the subterranean formation, and packing the surrounding annulus between the screen and the subterranean formation with particulate materials that are sized to prevent and inhibit the passage of formation solids through the gravel pack with produced fluids. In some instances, a screenless gravel packing operation may be performed.

SUMMARY

The present invention relates to well treatment fluids and methods utilizing nano-particles and, in certain embodiments, to well cement compositions and methods utilizing nano-hydraulic cement.

An embodiment of the present invention provides a method that comprises introducing a treatment fluid comprising nano-hydraulic cement into a subterranean formation.

Another embodiment of the present invention provides a method of cementing in a subterranean formation that comprises introducing a cement composition comprising nano-hydraulic cement and water into the subterranean formation; and allowing the cementing composition to set in the subterranean formation.

Another embodiment of the present invention provides a method of fracturing in a subterranean formation that comprises fracturing the subterranean formation; and introducing a proppant comprising a nano-particle into one or more fractures in the subterranean formation.

Another embodiment of the present invention provides a method of gravel packing in a subterranean formation that comprises depositing a volume of a particulate comprising a nano-particle into a well bore to at least partially reduce the migration of unconsolidated formation particulates into the well bore.

Another embodiment of the present invention provides a method that comprises introducing hydrated nano-hydraulic cement particulates into a subterranean formation.

Another embodiment of the present invention provides a well treatment fluid that comprises nano-hydraulic cement.

The features and advantages of the present invention will be readily apparent to those skilled in the art. While numerous changes may be made by those skilled in the art, such changes are within the spirit of the invention.

DESCRIPTION OF SPECIFIC EMBODIMENTS

The present invention relates to well treatment fluids and methods utilizing nano-particles and, in certain embodiments, to well cement compositions and methods utilizing nano-hydraulic cement.

An embodiment of the cement compositions of the present invention comprises nano-hydraulic cement, hydraulic cement, and water. Those of ordinary skill in the art will appreciate that the embodiments of the cement compositions generally should have a density suitable for a particular application. By way of example, the cement composition may have a density in the range of from about 4 pounds per gallon ("ppg") to about 20 ppg. In certain embodiments, the cement compositions may have a density in the range of from about 8 ppg to about 17 ppg. Embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Nano-hydraulic cements have a variety of applications for well cementing, including both primary and remedial cementing operations. Generally, "nano-hydraulic cement" may be defined as a cement with cement particles having a mean particle size of less than 1 micron. For example, nano-hydraulic cement may have a mean particle size in the range of from about 20 nanometers ("nm") to about 310 nm, alternatively about 20 nm to about 150 nm, and alternatively about 20 nm to about 100 nm. A suitable nano-hydraulic cement and technique that may be used to measure particle size, in accordance with embodiments of the present invention, is described by S C Halim, T J Brunner, R N Grass, M Bohner and W J Stark, *Preparation of an Ultra Fast Binding Cement from Calcium Silicate-Based Mixed Oxide Nanoparticles*, NANOTECHNOLOGY 18 (2007) 395701 (6 pp). Among other advantages of using nano-hydraulic cement is that it should provide a cement composition with a lower density and reduced set time. It is believed that the reduced set time of the nano-hydraulic cement may be from early reactivity. In addition, since nano-hydraulic cement particles are small particles, the nano-hydraulic cement should be capable of invading narrow openings that standard cements are unable to access. Accordingly, nano-hydraulic cements may be particularly suitable for use in squeeze cement applications. For example, nano-hydraulic cements may be used to seal voids in a pipe string, cement sheath, or gravel pack. As used herein, the term "void" refers to any type of space, including fractures, holes, cracks, spaces, channels, and the like. It is believed that the nano-hydraulic cement will be able to penetrate voids that are not repairable with larger-ized cements.

In certain embodiments, the treatment fluid comprises nano-hydraulic cement. Generally, any hydraulic cement suitable for use in cementing operations and sized less than 1 micron may be suitable for use as a nano-hydraulic cement in embodiments in the present invention. Suitable hydraulic cements include those classified as Classes A through H according to American Petroleum Institute, *API Specification for Materials and Testing for Well Cements*, API Specification 10, Fifth Ed., Jul. 1, 1990. In certain embodiments, API Class A, C, G and H nano-hydraulic cements may be preferred. A variety of nano-hydraulic cements are suitable for use, including those comprised of calcium, aluminum, silicon, oxygen, and/or sulfur, which set and harden by reaction with water. Such nano-hydraulic cements include, but are not limited to, Portland cements, pozzolanic cements, gypsum cements, soil cements, calcium phosphate cements, high-alumina content cements, silica cements, high-alkalinity cements, or mixtures thereof.

The nano-hydraulic cement may be present in embodiments of the cement compositions of the present invention in an amount of from about 0.01% to 100% by weight of cementitious material. As used herein, the term "cementitious material" refers to nano-hydraulic cement, hydraulic cement, and cement kiln dust, which set and harden by reaction with water. In some embodiments, the nano-hydraulic cement may be present in the cement compositions of the present invention in an amount of about 1% to 75% by weight of cementitious material. In some embodiments, the nano-hydraulic cement may be present in the cement compositions of the present invention in an amount of about 1% to about 50% by weight of cementitious material. In some embodiments, the nano-hydraulic cement may be present in the cement compositions of the present invention in an amount of about 1% to about 25% by weight of cementitious material.

Embodiments of the present invention may comprise a "hydraulic cement" that has a mean particle size of greater than 1 micron. Generally, any hydraulic cement suitable for use in cementing operations may be suitable for use in the present invention. Suitable hydraulic cements include those classified as Classes A through H according to American Petroleum Institute, API Specification for Materials and Testing for Well Cements, API Specification 10, Fifth Ed., Jul. 1, 1990. In certain embodiments, API Class A, C, G and H hydraulic cements may be preferred. A variety of hydraulic cements may be suitable for use, including those comprised of calcium, aluminum, silicon, oxygen, and/or sulfur, which set and harden by reaction with water. Such hydraulic cements include, but are not limited to, Portland cements, pozzolanic cements, gypsum cements, soil cements, calcium phosphate cements, high-alumina content cements, silica cements, high-alkalinity cements, or mixtures thereof. In some embodiments, the hydraulic cement may be a micro-fine cement (e.g., a micro-fine Portland cement) having a mean particle size of less than about 30 microns, alternatively less than about 17 microns, and alternatively less than about 11 microns. A suitable micro-fine Portland cement composition is described in U.S. Pat. No. 5,125,455, the disclosure of which is incorporated herein by reference.

Where present, the hydraulic cement generally may be included in the cement compositions in an amount sufficient to provide the desired compressive strength, density, and/or cost. In some embodiments, the hydraulic cement may be present in the cement compositions of the present invention in an amount of about 0% to about 99% by weight of cementitious materials. In some embodiments, the hydraulic cement may be present in the cement compositions of the present invention in an amount of about 0% to about 75% by weight of cementitious materials. In some embodiments, the hydraulic cement may be present in the cement compositions of the present invention in an amount of about 0% to about 50% by weight by weight of cementitious materials. In some embodiments, the hydraulic cement may be present in the cement compositions of the present invention in an amount in the range of from about 0% to about 25% by weight of cementitious materials.

In some embodiments, a pozzolanic cement that may be suitable for use comprises fly ash. As used herein, "fly ash" refers to the residue from the combustion of powdered or ground coal, wherein the fly ash carried by flue gases may be recovered, for example, by electrostatic precipitation. A variety of fly ashes may be suitable, including fly ash classified as Class C and Class F fly ash according to American Petroleum Institute, *API Specification for Materials and Testing for Well Cements*, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions is required for the Class F fly ash to form a cement composition with water. In some embodiments, lime may be mixed with Class F fly ash in an amount in the range of from about 0.1% to about 25% by weight of the fly ash. In some instances, the lime may be hydrated lime. Suitable examples of fly ash include, but are not limited to, "POZMIX® A" cement additive, commercially available from Halliburton Energy Services, Inc., Duncan, Okla.

Where present, the fly ash generally may be included in the cement compositions in an amount sufficient to provide the desired compressive strength, density, and/or cost. In some embodiments, the fly ash may be present in the cement compositions of the present invention in an amount of about 1% to about 75% by weight of cementitious materials. In some embodiments, the fly ash may be present in the cement compositions of the present invention in an amount of about 5% to about 50% by weight of cementitious materials.

In some embodiments, a slag cement that may be suitable for use may comprise slag. As used herein, "slag" refers to a granulated, blast furnace by-product formed in the production of cast iron and generally comprises oxidized impurities found in iron ore. Slag generally does not contain sufficient basic material, so slag cement further may comprise a base to produce a cement composition that may react with water to set to form a hardened mass. Examples of suitable sources of bases include, but are not limited to, sodium hydroxide, sodium bicarbonate, sodium carbonate, lime, and combinations thereof. In certain embodiments, the slag cement may comprise micro-fine slag wherein less than 3 weight % of the slag particles have a particle size of greater than about 7.8 microns. A suitable micro-fine slag composition is described in U.S. Pat. No. 5,026,215, the disclosure of which is incorporated herein by reference.

Where present, the slag cement generally may be included in the cement compositions in an amount sufficient to provide the desired compressive strength, density, and/or cost. In some embodiments, the slag cement may be present in the cement compositions of the present invention in an amount of about 1% to about 99% by weight of cementitious materials. In some embodiments, the slag cement may be present in the cement compositions of the present invention in an amount of about 1% to about 50% by weight of cementitious materials.

The water used in certain embodiments of the cement compositions of the present invention may be freshwater or saltwater (e.g., water containing one or more salts dissolved therein, seawater, brines, saturated saltwater, etc.). In general, the water may be present in an amount sufficient to form a pumpable slurry. In certain embodiments, the water may be present in the cement compositions in an amount in the range of about 33% to about 200% by weight of cementitious materials. In certain embodiments, the water may be present in an amount in the range of about 35% to about 70% by weight of cementitious materials.

In certain embodiments, the cement mixture will comprise cement kiln dust ("CKD"). As used herein, "CKD" refers to a partially calcined kiln feed which may be removed from the gas stream and collected in a dust collector during the manufacturer of cement. The CKD should be included in the cement compositions in an amount sufficient to provide the desired compressive strength, density, and/or cost reduction. In some embodiments, the CKD may be present in the cement compositions of the present invention in an amount of about 0.01% to about 99% by weight of cementitious materials. In some embodiments, the CKD may be present in the cement compositions of the present invention in an amount of about 1% to about 75% by weight of cementitious materials. In some embodiments, the CKD may be present in the cement compositions of the present invention in an amount of about 1% to about 50% by weight of cementitious materials. In some embodiments, the CKD may be present in the cement compositions of the present invention in an amount of about 1% to about 25% by weight of cementitious materials.

In certain embodiments, the cement compositions of the present invention may further comprise metakaolin. Generally, metakaolin is a white pozzolan that may be prepared by heating kaolin clay, for example, to temperatures in the range of from about 600° to about 800° C. In some embodiments, the metakaolin may be present in the cement compositions of the present invention in an amount of about 1% to about 50% by weight of cementitious materials. In some embodiments, the metakaolin may be present in an amount of about 1% to about 25% by weight of cementitious materials.

In certain embodiments, the cement compositions of the present invention further may comprise shale. Among other things, shale included in the cement compositions may react with excess lime to form a suitable cementing material, for example, calcium silicate hydrate. A variety of shales are suitable, including those comprising silicon, aluminum, calcium, and/or magnesium. An example of a suitable shale comprises vitrified shale. Suitable examples of vitrified shale include, but are not limited to, "PRESSUR-SEAL® FINE LCM" material and "PRESSUR-SEAL® COARSE LCM" material, which are commercially available from TXI Energy Services, Inc., Houston, Tex. Generally, the shale may have any particle size distribution as desired for a particular application. In certain embodiments, the shale may have a particle size distribution in the range of from about 37 micrometers to about 4,750 micrometers.

Where present, the shale may be included in the cement compositions of the present invention in an amount sufficient to provide the desired compressive strength, density, and/or cost. In some embodiments, the shale may be present in an amount of about 1% to about 75% by weight of cementitious materials. In some embodiments, the shale may be present in an amount of about 5% to about 35% by weight of cementitious materials. One of ordinary skill in the art, with the benefit of this disclosure, will recognize the appropriate amount of the shale to include for a chosen application.

In certain embodiments, the cement compositions of the present invention further may comprise zeolite. Zeolites generally are porous alumino-silicate minerals that may be either a natural or synthetic material. Synthetic zeolites are based on the same type of structural cell as natural zeolites, and may comprise aluminosilicate hydrates. As used herein, the term "zeolite" refers to all natural and synthetic forms of zeolite.

In certain embodiments, suitable zeolites for use in present invention may include "analcime" (which is hydrated sodium aluminum silicate), "bikitaite" (which is lithium aluminum silicate), "brewsterite" (which is hydrated strontium barium calcium aluminum silicate), "chabazite" (which is hydrated calcium aluminum silicate), "clinoptilolite" (which is hydrated sodium aluminum silicate), "faujasite" (which is hydrated sodium potassium calcium magnesium aluminum silicate), "ferrierite", "harmotome" (which is hydrated barium aluminum silicate), "heulandite" (which is hydrated sodium calcium aluminum silicate), "laumontite" (which is hydrated calcium aluminum silicate), "mesolite" (which is hydrated sodium calcium aluminum silicate), "natrolite" (which is hydrated sodium aluminum silicate), "paulingite" (which is hydrated potassium sodium calcium barium aluminum silicate), "phillipsite" (which is hydrated potassium sodium calcium aluminum silicate), "scolecite" (which is hydrated calcium aluminum silicate), "stellerite" (which is hydrated calcium aluminum silicate), "stilbite" (which is hydrated sodium calcium aluminum silicate), and "thomsonite" (which is hydrated sodium calcium aluminum silicate), and combinations thereof. In certain embodiments, suitable zeolites for use in the present invention include chabazite and clinoptilolite. An example of a suitable source of zeolite is available from the C2C Zeolite Corporation of Calgary, Canada.

In some embodiments, the zeolite may be present in the cement compositions of the present invention in an amount of about 1% to about 65% by weight of cementitious materials. In certain embodiments, the zeolite may be present in an amount of about 1% to about 40% by weight of cementitious materials.

In addition, certain embodiments of the cement compositions may comprise nano-silica. The nano-silica may be described as particulate nano-silica. That is, the nano-silica may be particulate in nature and not, for example, a colloidal silica or a suspension of silica in solution. Indeed, in one embodiment, the particulate nano-silica may be added to the cement composition as a dry nano-silica powder. Generally, the particulate nano-silica may be defined as nano-silica having a mean particle size of less than or equal to about 100 nm. For example, the particulate nano-silica may have a mean particle size in the range of from about 1 rm to about 100 nm (about $1 \times 10^{-9}$ m to about $100 \times 10^{-9}$ m). In certain embodiments, the particulate nano-silica may have a particle size of less than or equal to about 50 nm. For example, the particulate nano-silica may have a particle size in the range of from about 5 nm to about 50 nm. In further certain embodiments, the particulate nano-silica may have a particle size of less than or equal to about 30 nm. For example, the particulate nano-silica may have a particle size in the range of from about 5 nm to about 30 nm. However, it should be noted that the particulate nano-silica may be utilized in combination with differently sized silica particles in accordance with present embodiments. For example, a number of silica particles with particle sizes greater than 100 nm may be included in a cement composition in accordance with present embodiments.

It is now recognized that the particulate nano-silica utilized with present embodiments, which may include silicon dioxide, may have an impact on certain physical characteristics of resulting cements. For example, relative to inclusion of colloidal silica or larger silica particles in a cement slurry, inclusion of particulate nano-silica in the cement slurry may provide improved mechanical properties, such as compressive strength, tensile strength, Young's modulus and Poisson's ratio. In addition, the particulate nano-silica also may be included in the cement composition as a set accelerator to accelerate the set time of the resultant cement composition. Accordingly, a cement composition in accordance with present embodiments may comprise a sufficient amount of particulate nano-silica to provide the desired characteristics in a resulting cement. In certain embodiments, the particulate nano-silica may be present in the cement composition in an amount in the range of from about 1% to about 25% by weight of cementitious materials. In certain embodiments, the particulate nano-silica may be present in the cement composition in an amount in the range of from about 5% to about 15% by weight of cementitious materials.

Other additives suitable for use in subterranean cementing operations also may be added to certain embodiments of the cement compositions. Examples of such additives include, strength-retrogression additives, set accelerators, weighting agents, weight-reducing additives, heavyweight additives, lost-circulation materials, filtration-control additives, dispersants, defoaming agents, foaming agents, and combinations thereof. Specific examples of these, and other, additives include crystalline silica, amorphous silica, salts, fibers, hydratable clays, vitrified shale, microspheres, lime, latex, thixotropic additives, combinations thereof and the like. A person having ordinary skill in the art, with the benefit of this disclosure, will readily be able to determine the type and amount of additive useful for a particular application and desired result.

As will be appreciated by those of ordinary skill in the art, certain embodiments of the cement compositions of the present invention may be used in a variety of subterranean applications, including primary and remedial cementing. Certain embodiments of the cement compositions may be introduced into a subterranean formation and allowed to set therein. Certain embodiments of the cement compositions may comprise nano-hydraulic cement, hydraulic cement, and water. By way of example, in certain primary cementing embodiments, a cement composition may be introduced into a space between a subterranean formation and a pipe string located in the subterranean formation. The cement composition may be allowed to set to form a hardened mass in the space between the subterranean formation and the pipe string. In addition, in certain remedial cementing embodiments, a cement composition may be used, for example, in squeeze-cementing operations or in the placement of cement plugs. For example, embodiments of the cement compositions may used to: penetrate a gravel pack to shut off water or gas production, penetrate a gravel pack to divert steam injections, and penetrate a gravel pack to plug and abandon a well. One or more hydrocarbons (e.g., oil, gas, etc.) may be produced from a well bore penetrating the subterranean formation.

While the preceding discussion is directed to the use of a non-hydraulic, particulate nano-silica and nano-hydraulic cement, those of ordinary skill in the art will also appreciate that it may be desirable to utilize other suitable types of non-hydraulic nano-particles, in accordance with embodiments of the present invention. Examples of such non-hydraulic nano-particles include nano-clays, nano-alumina, nano-zinc oxide, nano-boron, nano-iron oxide and combinations thereof. In certain embodiments, the nano-particles may be particulate in nature and not, for example, a colloidal nano-particle or a suspension of the nano-particle in solution. In certain embodiments, the nano-clay may comprise nano-montmorillonite. Nano-montmorillonite is member of the smectite-clay family, and belongs to the general mineral group of clays with a sheet-like structure where the dimensions in two directions far exceed its thickness. Generally, the nano-montmorillonite has of a three-layered structure of aluminum sandwiched between two layers of silicon, similar to the mica-type layered silicates. Montmorillonite is an active and major ingredient in a volcanic ash called bentonite, which has an ability to swell to many times its original weight and volume when it absorbs water. One example of a suitable nano-montmorillonite is NANOMER1 nanoclay, which is available from Nanocor, Arlington Heights, Ill.

Furthermore, while the preceding discussion is directed to the use of nano-particles in well cementing methods, those of ordinary skill in the art will appreciate that the present technique also encompasses the use of nano-particles in any of a variety of different subterranean treatments. For example, nano-hydraulic cement may be included in any of a number of well treatment fluids that may be used in subterranean treatments, including drilling fluids, completion fluids, stimulation fluids and well clean-up fluids. In accordance with another embodiment, the nano-hydraulic cement may be included as proppant in a well treatment fluid. By way of example, a proppant may be used that comprises nano-hydraulic cement. In the proppant embodiments, the proppant comprising the nano-hydraulic cement may be prepared by a process comprising: allowing a cement composition comprising water, nano-hydraulic cement, and an optional hydraulic cement to set into a substantially hydrated mass; and comminuting the substantially hydrated mass into smaller particles so as to form the proppant (or substantially hydrated cement particles). The preparation of substantially hydrated cement particles is described in more detail in U.S. Pat. No. 6,648,962, the disclosure of which is incorporated herein by reference. When used as a proppant, for example, a well treatment fluid containing the proppant may be introduced into a subterranean formation at or above a fracturing pressure of a subterranean formation. At least a portion of the proppant may be deposited in one or more fractures in the subterranean formation such that the fractures are prevented from fully closing upon the release of pressure, forming conductive channels through which fluids may flow to (or from) the well bore.

In addition, the nano-particles may be also be used in gravel-packing operations. For example, particulates comprising nano-hydraulic cement may be used in a gravel-packing operation. A "gravel pack" is a term commonly use to refer to a volume of particulate materials (such as sand) placed into a well bore to at least partially reduce the migration of unconsolidated formation particulates into the well bore. The particulates for use in the gravel-packing operations may be prepared in a manner similar to the proppant comprising the nano-hydraulic cement. In gravel-packing embodiments, a volume of particulates comprising the nano-hydraulic cement may be placed in a gravel pack in a subterranean formation. In certain embodiments, a screen may be placed in the well bore and the annulus between the screen and the subterranean formation may be packed with the particulates. In certain embodiments, a screenless gravel-packing operation may be performed.

In addition to the use of the nano-particles without encapsulation, embodiments of the present invention may include using the nano-particles in a contained form. Among other things, use of contained nano-particles should facilitate their use in subterranean applications, for example, by alleviating potentially handling problems. In certain embodiments, contained nano-particles include encapsulated nano-particles. Specifically, encapsulation of the nano-particles in accordance with present embodiments may include enclosing the nano-particles within an outer coating or container in particulate form. Certain methods of encapsulation are set forth in U.S. Pat. Nos. 5,373,901; 6,444,316; 6,527,051; 6,554,071; 7,156,174; and 7,204,312, the disclosures of which are incorporated herein by reference.

Various types of encapsulation may be employed such that the nano-particles (e.g., the nano-hydraulic cement) are contained but retains its particulate nature and, thus, retains its corresponding impact on physical properties of cement slurries. For example, the nano-particles may be encapsulated within a bag, capsule, layer, coating or the like. Further, the material utilized to encapsulate the nano-particles may be selected to facilitate transportation and/or incorporation of the nano-particles into a well treatment fluid. For example, to facilitate handling of the nano-particles and/or to facilitate timed release of the nano-particles, the encapsulation material may be degradable. This may facilitate handling of the nano-particles by allowing inclusion of the encapsulated nano-particles in a well treatment fluid without requiring that the nano-particles first be removed from the encapsulating material. Further, the encapsulating material may be designed to degrade at a certain rate when in contact with certain materials (e.g., water) so that the nano-particles are released into the well treatment fluid at a desired time. Certain water-dissolvable materials that may be utilized to encapsulate the nano -particles are described in U.S. Pat. Nos. 4,961,790 and 5,783,541, the disclosures of which are incorporated herein by reference.

In accordance with certain embodiments, the cement compositions of the present invention may utilize a packing volume fraction suitable for a particular application as desired. As used herein, the term "packing volume fraction" refers to the volume of the particulate materials in a fluid divided by the total volume of the fluid. The size ranges of the preferred particulate materials are selected, as well as their respective proportions, in order to provide a maximized packing volume fraction so that the fluid is in a hindered settling state. It is known that, in such a state, the particulate materials behave "collectively" like a porous solid material. The hindered settling state is believed to correspond, in practice, to a much higher solid material concentration in the fluid than that present in the some traditional cement compositions.

The present embodiments may include a combination of at least three features to obtain a maximum packing volume fraction. One is the use of at least three particulate materials wherein the at least three particulate materials are in size ranges "disjointed" from one another. In some embodiments, each of the three particulate materials may include a different particle size selected from the following ranges: about 7 nm to about 50 nm, about 0.05 microns to about 0.5 microns, 0.5 microns to about 10 microns, about 10 microns to about 20 microns, about 20 microns to about 200 microns, about 200 microns to about 800 microns, and greater than about 1 millimeter. For example, a first particulate material may include particles sized from about 7 nm to about 50 nm, a second particulate material may include particles sized from about 0.05 microns to about 0.5 microns, and a third particulate material may include particles sized from about 10 microns to about 20 microns. In accordance with present embodiments, the first particulate material includes at least one of nano-hydraulic cement, nano-clay, nano-silica, nano-alumina, nano-zinc oxide, nano-boron, nano-iron oxide or combinations thereof. In certain embodiments, one or more of nano-hydraulic cement, micro-fine hydraulic cement, micro-fine slag, or other nano-particles may be used to maximize the packing volume fraction. Another feature of present embodiments may include a choice of the proportions of the three particulate materials in relation to the mixing, such that the fluid, when mixed, is in a hindered settling state. Another feature may include the choice of the proportions of the three particulate materials between each other, and according to their respective size ranges, such that the maximum packing volume fraction is at least substantially achieved for the sum total of all particulate materials in the fluid system. Packing volume fraction is described in further detail in U.S. Pat. No. 7,213,646, the disclosure of which is incorporated herein by reference.

In certain embodiments of the present invention, the nano-hydraulic cement composition described herein may be foamed using a gas and a foaming surfactant. The gas utilized in the foamed cement compositions of the present invention may be any gas suitable for foaming a cement composition, including, but not limited to, air or nitrogen, or combinations thereof. Generally, the gas should be present in the foamed cement compositions of the present invention in an amount sufficient to form a suitable foam. In certain embodiments, the gas may be present in an amount in the range of from about 10% and about 80% by volume of the composition.

Any suitable foaming and stabilizing surfactant may be used in the foamed cement composition of the present invention. Among other things, the foaming and stabilizing surfactants may facilitate the foaming of a cement composition and/or also stabilize the resultant foamed cement composition formed therewith. Suitable foaming and stabilizing surfactants may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable hydrolyzed keratin is described in U.S. Pat. No. 6,547,871, the disclosure of which is incorporated herein by reference. Example of suitable mixtures of an ethoxylated alcohol ether sulfate surfactant, an alkyl or alkene amidopropyl betaine surfactant, and an alkyl or alkene dimethylamine oxide surfactant is described in U.S. Pat. No. 6,063,738, the disclosure of which is incorporated herein by reference. Examples of suitable aqueous solutions of an alpha-olefinic sulfonate surfactant and a betaine surfactant are described in U.S. Pat. No. 5,897,699, the disclosure of which is incorporated herein by reference. In one embodiment, the foaming and stabilizing surfactant comprises a mixture of an ammonium salt of an alkyl ether sulfate, a cocoamidopropyl betaine surfactant, a cocoamidopropyl dimethylamine oxide surfactant, sodium chloride, and water.

Generally, the foaming and stabilizing surfactants should be present in the foamed cement compositions of the present invention in an amount sufficient to provide a suitable foam. In some embodiments, the foaming and stabilizing surfactant may be present in an amount in the range of from about 0.8% and about 5% by volume of the water present in the foamed cement composition.

Embodiments of the settable compositions of the present invention may also comprise swellable particles. As used herein, a particle is characterized as swelling when it swells upon contact with oil and/or an aqueous fluid (e.g., water). Swellable particles suitable for use in embodiments of the present invention may generally swell by up to about 50% of their original size at the surface. Under downhole conditions, this swelling may be more, or less, depending on the conditions presented. For example, the swelling may be at least 10% at downhole conditions. In some embodiments, the swelling may be up to about 50% under downhole conditions. However, as those of ordinary skill in the art, with the benefit of this disclosure, will appreciate, the actual swelling when the swellable particles are included in a settable composition may depend on, for example, the concentration of the swellable particles included in the settable composition. In accordance with embodiments of the present invention, the swellable particles may be included in the settable composition, for example, to counteract the formation of cracks in the cement sheath and/or micro-annulus between the cement sheath and the pipe string or the formation. In general, the swellable particles should be capable of swelling when contacted by aqueous fluids and/or oil to inhibit fluid flow through the crack and/or micro-annulus. Accordingly, the swellable particles may prevent and/or reduce the loss of zonal isolation in spite of the formation of cracks and/or micro-annulus, potentially resulting in an improved annular seal for the extended cement compositions.

An example of swellable particles that may be utilized in embodiments of the present invention comprises a swellable elastomer. Some specific examples of suitable swellable elastomers include, but are not limited to, natural rubber, acrylate butadiene rubber, polyacrylate rubber, isoprene rubber, choloroprene rubber, butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorborneane), and alkylstyrene. One example of a suitable swellable elastomer comprises a block copolymer of a styrene butadiene rubber. Examples of suitable elastomers that swell when in contact with oil include, but are not limited to, nitrile rubber (NBR), hydrogenated nitrile rubber (HNBR, HNS), fluoro rubbers (FKM), perfluoro rubbers (FFKM), tetrafluoroethylene/propylene (TFE/P), isobutylene maleic anhydride. Combinations of suitable swellable elastomers may also be used. Other swellable elastomers that behave in a similar fashion with respect to oil or aqueous fluids also may be suitable. Those of ordinary skill in the art, with the benefit of this disclosure, will be able to select an appropriate swellable elastomer for use in embodiments of the settable compositions of the present invention based on a variety of factors, including the application in which the composition will be used and the desired swelling characteristics.

An example of swellable particles that may be utilized in embodiments of the present invention comprises a water-swellable polymer. Some specific examples of suitable water-swellable polymers, include, but are not limited to starch-polyacrylate acid graft copolymer and salts thereof, polyethylene oxide polymer, carboxymethyl cellulose type polymers, polyacrylamide, poly(acrylic acid) and salts thereof, poly(acrylic acid-co-acrylamide) and salts thereof, graft-poly(ethylene oxide) of poly(acrylic acid) and salts thereof, poly(2-hydroxyethyl methacrylate), and poly(2-hydroxypropyl methacrylate). Combinations of suitable water-swellable polymers may also be used. In certain embodiments, the water-swellable polymers may be crosslinked and/or lightly crosslinked. Other water-swellable polymers that behave in a similar fashion with respect to aqueous fluids also may be suitable. Those of ordinary skill in the art, with the benefit of this disclosure, will be able to select appropriate water-swellable polymers for use in embodiments of the settable compositions of the present invention based on a variety of factors, including the application in which the composition will be used and the desired swelling characteristics.

Where used, the swellable particles generally may be included in the settable compositions in an amount sufficient to provide the desired mechanical properties. In some embodiments, the swellable particles may be present in the settable compositions in an amount up to about 25% by weight of the cementitious component. In some embodiments, the swellable particles may be present in the settable compositions in a range of about 5% to about 25% by weight of the cementitious component. In some embodiments, the swellable particles may be present in the settable compositions in a range of about 15% to about 20% by weight of the cementitious component.

In addition, the swellable particles that are utilized may have a wide variety of shapes and sizes of individual particles suitable for use in accordance with embodiments of the present invention. By way of example, the swellable particles may have a well-defined physical shape as well as an irregular geometry, including the physical shape of platelets, shavings, fibers, flakes, ribbons, rods, strips, spheroids, beads, pellets, tablets, or any other physical shape. In some embodiments, the swellable particles may have a particle size in the range of about 5 microns to about 1,500 microns. In some embodiments, the swellable particles may have a particle size in the range of about 20 microns to about 500 microns. However, particle sizes outside these defined ranges also may be suitable for particular applications.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of primary cementing in a subterranean formation comprising:
   introducing a cement composition comprising nano-hydraulic cementitious particles and water into the subterranean formation, wherein the water is present in an amount between about 33% to about 200% of the cement composition, wherein the nano-hydraulic cementitious particles have a mean particle size of between about 20 nanometers to about 100 nanometers, the nano-hydraulic cementitious particles being selected from the group consisting of a Portland cement, a pozzolanic cement, a gypsum cement, a soil cement, a calcium phosphate cement, a high-alumina content cement, a silica cement, a high-alkalinity cement, and any combination thereof; and
   allowing the cement composition to set in the subterranean formation by reaction of the nano-hydraulic cementitious particles and the hydraulic cement with the water to form a hardened mass in a space between the subterranean formation and a pipe string.

2. The method of claim 1 wherein the nano-hydraulic cementitious particles comprises the pozzolanic cement.

3. The method of claim 1 wherein the nano-hydraulic cementitious particles comprises the Portland cement.

4. The method of claim 1 wherein the cement composition further comprises at least one nano-particle selected from the group consisting of nano-silica, nano-clay, nano-alumina, nano-zinc oxide, nano-boron, nano-iron oxide, and any combination thereof.

5. The method of claim 1 wherein the cement composition further comprises a nano-clay.

6. The method of claim 1 wherein the cement composition further comprises a swellable particle.

7. The method of claim 1 wherein the cement composition further comprises micro-fine slag.

8. The method of claim 1 wherein the cement composition further comprises micro-fine cement having a mean particle size of less than about 30 microns, but larger than 1 micron.

9. The method of claim 1 wherein the cement composition comprises cement kiln dust.

10. The method of claim 1 wherein the cement composition comprises at least one additive selected from the group consisting of fly ash, shale, slag, zeolite, metakaolin, and any combination thereof.

11. The method of claim 1 wherein the cement composition is foamed.

12. The method of claim 1 comprising maximizing a packing volume fraction in the cement composition.

13. The method of claim 1 further comprising providing the nano-hydraulic cementitious particles, wherein at least of a portion of the nano-hydraulic cementitious particles as provided is contained or encapsulated in a degradable material.

14. The method of claim 1 wherein the nano-hydraulic cement particles are is present in the cement composition in an amount of about 1% to about 25% by weight of cementitious material.

15. A method of primary cementing in a subterranean formation comprising:
   providing nano-hydraulic cementitious particles, selected from the group consisting of a Portland cement, a pozzolanic cement, a gypsum cement, a soil cement, a calcium phosphate cement, a high-alumina content cement, a silica cement, a high-alkalinity cement, and any combination thereof, wherein the nano-hydraulic cementitious particles have a mean particle size between about 20 nanometers to about 100 nanometers; wherein the nano-hydraulic cementitious particles are present in an amount of about 0.1% to 50% by weight of cementitious components;
   providing hydraulic cement having a mean particle size of greater than 1 micron; wherein the hydraulic cement is present in an amount of about 1% to 99% by weight of cementitious components;
   preparing a cement composition comprising the nano-hydraulic cementitious particles, the hydraulic cement, and water, wherein the water is present in an amount between about 33% to about 200% of the nano-hydraulic cement particles;

introducing the cement composition into the subterranean formation; and allowing the cement composition to set in the subterranean formation by reaction of the nano-hydraulic cementitious particles and hydraulic cement with the water to form a hardened mass in a space between the subterranean formation and a pipe string.

16. The method of claim 15 wherein the nano-hydraulic cementitious particles have a mean particle size of less than about 50 nanometers.

17. The method of claim 15 wherein the nano-hydraulic cementitious particles are present in an amount of about 1% to about 25% by weight of cementitious components.

18. The method of claim 15 wherein the hydraulic cement is present in an amount of about 1% to 50% by weight of cementitious components.

19. The method of claim 15 wherein the nano-hydraulic cementitious particles comprise the Portland cement.

20. The method of claim 15 wherein the cement compositions further comprises at least one nano-particle selected from the group consisting of nano-silica, nano-clay, nano-alumina, nano-zinc oxide, nano-boron, nano-iron oxide, and any combination thereof.

21. The method of claim 15 wherein the cement composition further comprises a swellable particle.

22. The method of claim 15 wherein the hydraulic cement comprises micro-fine cement having a mean particle size of less than about 30 microns.

23. The method of claim 15 wherein the cement composition comprises cement kiln dust.

* * * * *

UNITED STATES PATENT AND TRADEMARK OFFICE
CERTIFICATE OF CORRECTION

PATENT NO. : 9,512,346 B2
APPLICATION NO. : 12/263954
DATED : December 6, 2016
INVENTOR(S) : Craig W. Roddy Page 1 of 1

It is certified that error appears in the above-identified patent and that said Letters Patent is hereby corrected as shown below:

In the Claims

Column 14 Line 43, Claim 14 correct "are is" to -are-.

Signed and Sealed this
Eighteenth Day of April, 2017

Michelle K. Lee
*Director of the United States Patent and Trademark Office*